United States Patent [19]

Lanzerath et al.

[11] 4,252,221

[45] Feb. 24, 1981

[54] FREEWHEEL CLUTCH WITH A CAGE FOR RECEIVING AND RETAINING THE GRIPPING ELEMENTS

[75] Inventors: Gunter F. Lanzerath, Heidelberg; Rudolf Müller, Ladenburg; Karl H. Patzer, NuBloch; Richard Vögele, AltluBheim; Erich Bollmann, Mannheim; Heinz Glaunsinger, Wiesenbach; Karl-Josef Hallerberg; Bernhard Hülsebusch, both of Plankstadt, all of Fed. Rep. of Germany

[73] Assignee: Borg-Warner-Stieber GmbH, Heidelberg, Fed. Rep. of Germany

[21] Appl. No.: 887,082

[22] Filed: Mar. 16, 1978

[30] Foreign Application Priority Data

Mar. 30, 1977 [DE] Fed. Rep. of Germany ....... 2714046

[51] Int. Cl.³ .................................. F16D 41/07
[52] U.S. Cl. .................... 192/41 A; 192/45.1
[58] Field of Search ............. 192/41 A, 45.1; 188/82.8

[56] References Cited

U.S. PATENT DOCUMENTS

| 2,744,598 | 5/1956 | Troendly | 192/45.1 |
|---|---|---|---|
| 2,812,839 | 11/1957 | Cobb | 192/45.1 |
| 2,940,567 | 6/1960 | Dodge | 192/45.1 |
| 3,194,369 | 7/1965 | Witte | 192/45.1 |
| 3,207,278 | 9/1965 | Titt | 192/45.1 |
| 3,219,163 | 11/1965 | Zlotek | 192/45.1 |
| 4,114,739 | 9/1978 | Colonna et al. | 192/45.1 X |

FOREIGN PATENT DOCUMENTS

| 2155419 | 5/1973 | Fed. Rep. of Germany | 192/45.1 |
|---|---|---|---|
| 1072566 | 9/1954 | France | 192/45.1 |
| 1254264 | 1/1961 | France | 192/45.1 |

*Primary Examiner*—Rodney H. Bonck
*Attorney, Agent, or Firm*—James A. Geppert; Herman E. Smith

[57] ABSTRACT

A freewheel clutch includes a ladder-like guide band, and a cage for receiving and retaining a group of wedging gripping members in an annular space between a pair of concentric races, preferably the cage is formed from a flexible flat strip having windows defined therein including supports and resilient biasing lugs formed by the edges of the windows and having radially extending supports all unitary with the strip, opposite end windows being over-lappable and interlockable with each other to form an annular cage, the guide band may be formed of a rubber-like material or a combination of a molded material and wire, or by a continuously coiled wire defining a group of adjacent coils alternately joined by their ends forming spacers for the gripper elements.

16 Claims, 11 Drawing Figures

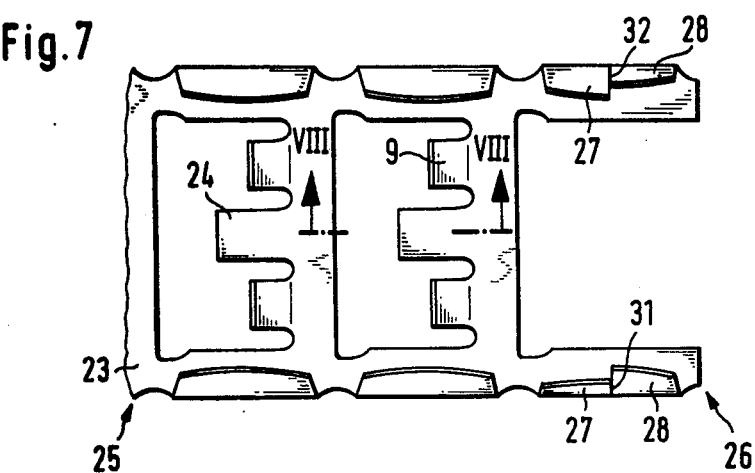
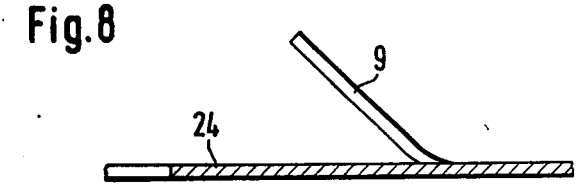
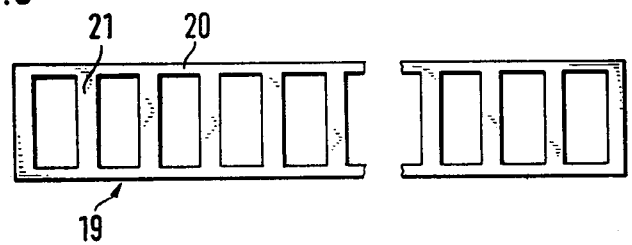

FREEWHEEL CLUTCH WITH A CAGE FOR RECEIVING AND RETAINING THE GRIPPING ELEMENTS

BACKGROUND OF THE INVENTION

The invention concerns a freewheel clutch in which the gripping elements are held in a cage. In known forms of execution of such freewheels, such as shown in German Specification 1,111,465, the tilting gripping elements are located between an outer race ring and an inner race ring arranged concentrically to it. The gripping elements can be individually biased in the clutching direction by springs and be held in their position by separate spacers or specially designed cages. In order to achieve an equal bearing load distribution of the gripping elements, in the case of a known form of execution two separate cage rings are provided into which windows are cut for the reception of the gripping elements. By means of the arrangement in two cage rings, the gripping elements are carried at two levels and the result is that all gripping elements are equally engaged as soon as the first gripping element makes a swing and moves the cage rings relative to each other. The biasing of the individual gripping elements in this known form of execution is achieved by means of a ribbon spring which is inserted between the concentric cage rings and biases each gripping element separately via individual spring tongues. The cage ring of a freewheel clutch and the clutch itself are made to a preselected diameter. This is also true for the tools required for production.

SUMMARY OF THE INVENTION

The objective of the invention is to create a freewheel clutch which is simple in construction and technically easy to produce. At the same time, the feature that all gripping elements are used optimally in clutch operations is to be retained. The solution to the problems posed is found by the invention by having the cage consist of a spring steel strip provided with windows for the gripping elements and having two ends that can be coupled together, in the cage's being elastically deformable in radial direction in the unassembled state, in the gripping elements' being held in the windows of the steel strip and in the gripping elements' being embraced by a cage-like ladder guide band consisting preferably of an elastic material with a number of discontinuities or interruptions corresponding to the number of cage windows.

The cage of the new freewheel clutch is thus essentially manufactured from a unitary strip, in whose windows the gripping elements are held. For holding the gripping elements to the opposite edges of the windows on the cage, resilient projections are provided for the biasing of the gripping elements. In addition to these resilient projections for the biasing of the gripping elements, additional support lugs for the gripping elements project from the edges of the windows which protect the gripping elements from an unintended twisting and an undersirable disengagement. The edges of the windows opposite the resilient projections and support lugs constitute the countersupports for the gripping elements. The resilient projections themselves are preferably located in the middle of the windows and consist of folded tabs with projecting tongues. The gripping elements are inserted appropriately into the windows. They rest in each case on one side against the straight edge of the window, while the other side is biased in the clutching direction by a spring biasing lug which is located on the opposite edge of the window.

The gripping elements used are tapered in known manner toward the middle. This is especially advantageous for the mounting and biasing of the gripping elements. The strip steel band itself is preferably provided with lateral supports for radial alignment. It has also proven to be advantageous when these lateral supports are inclined inward. This prevents the supports from catching in any slots of spring washers.

The spring steel band itself is made open, i.e., with two ends that can be coupled. Its closure into a round cage can be effected by providing a blank window on one end made without a biasing lug and support lugs and placing it over the last window of the other end of the band. It catches with its outer flange or edge behind the fold of the biasing lug. The location of the connection for the cage band end is thus formed from a blank window with broken away biasing element and support lug.

An especially practical closure device is obtained by having it consist of a window with the lateral flanges and with lateral supports without the terminal flange at the steel band end and a window without the final flange on the other steel band end, with the lateral supports being divided in their middle planes and the two parts of a support being inclined inward at different angles, so that when the steel band ends are pushed together, a mutual locking occurs. Such a closure prevents the cage from contracting. It can also be made in such a way that the separation of the band is prevented.

It is advantageous to have the steel band, the biasing lugs and the support flanges consist of one piece. The cage can then be produced by the stamping method. From one strip the desired steel bands can be produced in predetermined lengths by stamping out and then bending or folding. This is of particular advantage when resilient bands of different lengths are needed for cages of large diameter.

In order to achieve a synchronous guidance of the gripping elements in the freewheel clutch in question, a cage-like guide band is provided, consisting preferably of an elastic material, which has a number of openings coinciding with the cage. This guide band thus has discontinuities which correspond to the number of windows of the steel band and are arranged to correspond to them. The preferred embodiment provides for the lateral supports of the cage to be aligned with the freewheel rotating race, in most cases, the outer race ring, and for the guide band to be located on the opposite side, in the most cases, on the side of the inner race ring. The individual crosspieces of the guide band are made in such a way that they fill up the space between two gripping elements without clearance and thus hold the clamping elements at equal distances. The guide band can likewise be made endless and cut into appropriate lengths. The joining of the guide band ends can be achieved with wire hooks. They can also be omitted, since the guide band is held by the gripping elements.

The guide band causes all the gripping elements to be engaged when loading occurs. The guide band has the further characteristic of damping vibrations in the gripping elements.

The invention is explained more clearly with the help of the drawings.

BRIEF DESCRIPTION OF THE DRAWINGS

FIG. 7 shows the cage according to FIG. 6 with bent over biasing lugs and supports;

FIG. 8 shows a section through the biasing lug along line VIII—VIII of FIG. 7; and FIGS. 9–11 show guide bands in plan view.

DESCRIPTION OF THE PREFERRED EMBODIMENT

Figure 1:
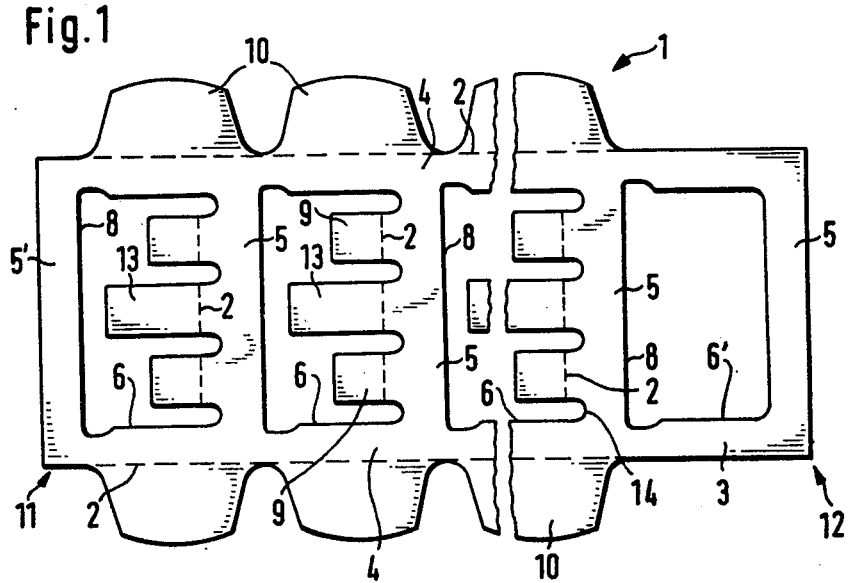
FIG. 1 shows the cage after the stamping out from a metal strip, in a plan view.

FIG. 1 shows the essential elements of the cage band 1 immediately after being stamped out of a steel strip. All parts of the cage 3 are still in one plane. The places where the cage parts are bent over are indicated by broken lines 2. The strip steel band 1 consists essentially of two lateral strips 4, which are connected with each other by the crosspieces 5. Between the crosspieces 5 are the windows 6 for receiving the gripping elements 7. Each crosspiece 5 has a straight edge 8 on one side, while the opposite side has an edge 14 with a spring lug 13 for biasing the gripping element 7 and two flanges 9 for the support of the gripping element 7. On the outer side of the lateral band 4 are the projections serving as supports 10. Since all windows 6 up to the blank connecting window 6' are alike, only the two ends 11 and 12 of the band 1 are shown in the FIGURE. Whereas the window 6 on the left-hand side of the FIGURE ends in a closure piece 5', the window visible on the righthand side is the blank connecting window 6'. This blank connecting window 6' differs from the other window 6 in that it has no spring lug 13 and no support flange 9 for the biasing or support of the gripping element 7 and, further, no supports 10 are provided on the side bands 4 of the band. The thus-formed blank window 6' can then, in order to achieve a connection or coupling of the two band ends 11 and 12 be placed over the last window 6 of the other end 11, without interfering with the operation of the gripping elements 7 inserted into this window 6. Laterally the blank connecting window 6' is held by the bent over supports 10 of the last window 6, while in the circumferential direction the folded spring lug 13 and also the gripping element 7 itself are employed for locking.

Figure 2:
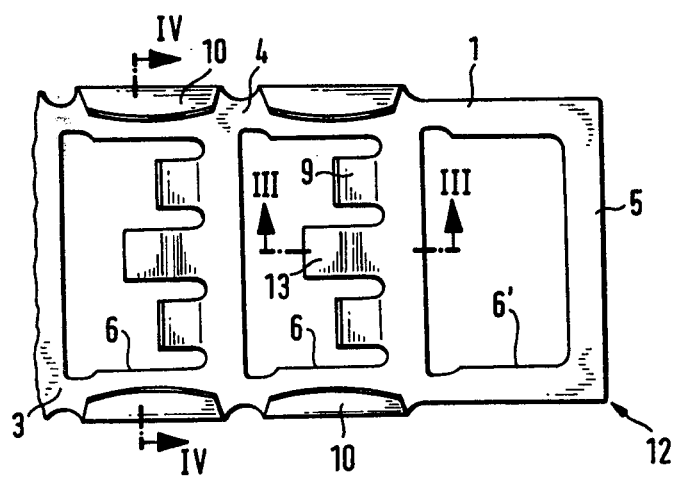
FIG. 2 shows a cage end with connector openings and with bent over spring biasing lugs and supports.

In FIG. 2, the end 12 of the cage 3 provided with the blank connecting window 6' is shown, with the lugs 13 and the flanges 9 for biasing and support, respectively, of the gripping elements 7, as well as the supports 10, already bent over or folded.

Figure 3:
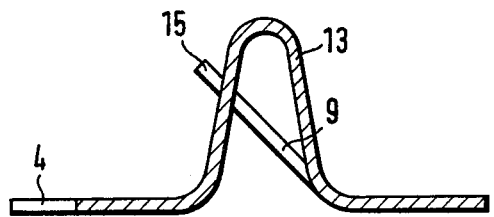
FIG. 3 shows a section through the biasing lug along line III—III of FIG. 2.

In FIG. 3, the folding of the spring lug 13 and of the support flange 9 is recognizable. While the support flanges 9 are simply folded upward and with their outer edges 15 protecting the later-inserted gripping element 7 from unwanted turning, the spring lug 13 has been subjected to a three-fold bending. In cooperation with the correspondingly shaped gripping element 7, the spring lug 13 urges the gripping element 7 in the clutching direction.

Figure 4:
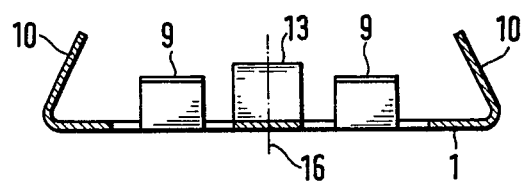
FIG. 4 shows a section through the cage along line IV—IV of FIG. 2.

FIG. 4 shows a section through the band 1, in which the position of the lateral supports 10 is made visible. The lateral supports 10 are inclined inward. Here the symmetry plane 16 of the cage 3 is to be regarded as inward. In relation to the axis of rotation 35 of the clutch, the lateral supports 10 are bent outward.

The band shown in FIGS. 1–4 is bent and connected with its two ends 11 and 12 in the above-described manner. The gripping elements 7 can be inserted into the still flat band 1 or into the bowed and cage-forming band 1. The insertion of the last gripping element 7 into the blank connecting window 6' is done, of course, only after the bending of the band 1 and corresponding arrangement of the two end windows over each other. The coupling is, however, even without the insertion of a gripping element 7 in the blank connecting window 6', fully operational.

The band 1 thus produced and outfitted with the gripping elements 7 can be inserted into a corresponding freewheel clutch between the two race rings 17 and 18.

Figure 5:
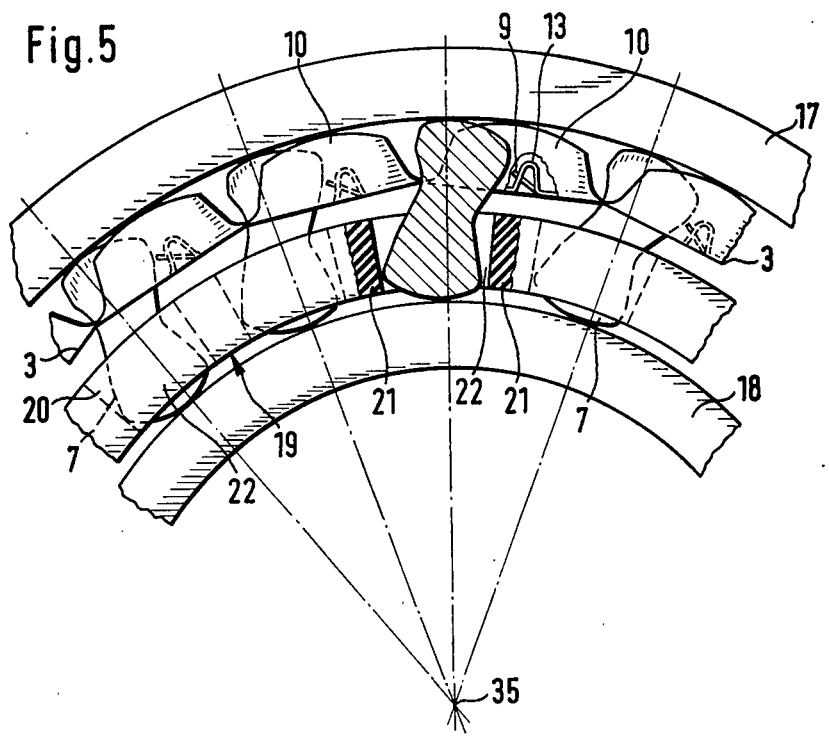
FIG. 5 shows a cage section with guide band and inserted gripping elements.

In FIG. 5 such a freewheel clutch is shown in crossection. Between the two race rings 17, 18 of the freewheel clutch there is the band cage 3 with the gripping elements 7. The cage itself is supported with its lateral supports 10 against the outer cage ring 17 of the clutch. The gripping elements 7 taper toward their middle and rest with their indentation against the edge of the crosspiece 5. From the other side, the gripping elements 7 are held by the spring lugs 13 and biased in the direction of action. Under operating conditions, when an undesired turning of the gripping element 7 can take place, the gripping elements 7 are abutted by the support flanges 9.

In addition to the cage 3 made from the band 1, the clutch is provided with the guide band 19 consisting of rubber or another material. The guide band 19 is located between the band cage 3 and the inner race ring 18 of the clutch. It consists essentially of the support strips 20 and the individual crosspieces 21. The crosspieces 21 themselves are preferably right angled and so dimensioned in their size that they serve as spacers between the individual gripping elements 7. The rubber strip has the effect of engaging the gripping elements synchronously. The number of the discontinuities 22 bordered by the crosspieces 21 is equal to the number of cage windows.

Figure 6:
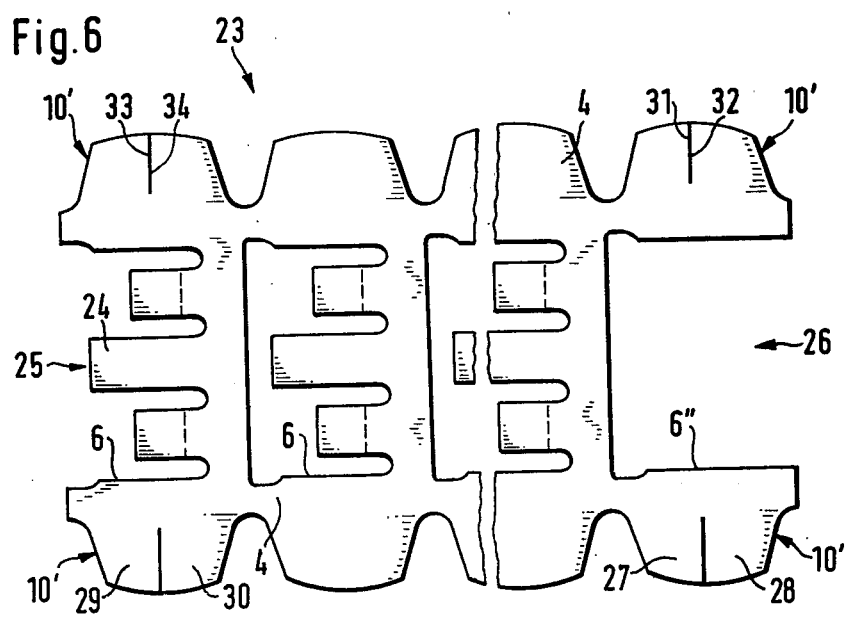
FIG. 6 shows another embodiment of the cage in plan view.

In FIGS. 6–8, a cage is shown which differs from the above-described cage by another execution of the spring lugs 24 and of the closure device joining the cage ends 25 and 26. In this embodiment the spring lugs 24 are not folded. Rather, they lie, as can be seen particularly in FIG. 8, in the same plane as the side strips 4. The support flanges 9 on the other hand are bent upward as before.

The coupling of the cage strip ends 25 and 26 is achieved by the pushing together of the two end. In the two end openings, however, the terminal opening flanges 5 and 5' have been eliminated. On the other hand, the side opening flanges, which are formed by the lateral strips 4, are provided with lateral supports which are divided in their middle planes. The parts 27 and 28 of the lateral supports 10' of the one end 26 as well as the parts 29 and 30 of the lateral supports 10' of the other band end 25 are inclined inward at different angles to the symmetry plane of the cage. The result of this is that when the band ends 25 and 26 are pushed together, the corresponding edges 31 and 32 of the supports 10' of the one end 26 interact with the corresponding edges 33 and 34 of the supports 10' of the other band end 25. Depending on the degree of bending of the parts 27–30, when the ends 25 and 26 are pushed together, support can be obtained in one or the other circumferential directions of the cage, or locking occurs and support in both directions is provided. If, for example, the band end 26, as shown in FIG. 7, is provided with a folding of the parts, where the parts 27 are more greatly inclined inward than the parts 28 and on the other band end such an inclination of the parts is made that the parts 29 are even more greatly inclined than the parts 27 and the inclination of the parts 30 takes an attitude that lies between the inclinations of the parts 27 and 28, then when the end 25 is pushed into the end 26, the edges 34 lie against the edges 31. Further compression of the cage would thus be prevented. In a reversed embodiment, in which the outer parts 28 are more strongly inclined than the parts 27 and the parts 29 assume an intermediate attitude, the pushing together can result in the edges 32 and 33 lying against one another and thereby preventing an expansion of the cage.

A third solution: a reciprocal different inclination of the parts is made, so that a complete locking of the band ends takes place. This is achieved by having the upper parts 27 and 28 shown in FIG. 7 inclined as shown and giving the parts 27 and 28 in the lower half of the FIGURE a reverse inclination, i.e., by having the part 28 more inclined than part 27. By means of the appropriate adjustment of the parts 29 and 30 of the band end 25, the corresponding edges mutually engage and prevent the displacement of the ends in the one and the other direction.

FIG. 9 shows the ladder-like guide band 19 ready for installation consisting of the side supporting strips 20 and the individual crosspieces. The guide band is inserted in the cage and serves as spacer and guide means for the gripping elements 7.

Figure 10:
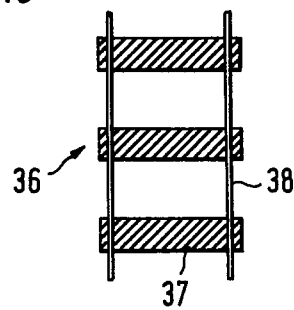

The guide band 36 shown in FIG. 10 consists of the crosspieces 37 and the lateral support bands 38. The crosspieces are made of synthetic material, while the lateral support bands consists preferably of a steel wire which is injection molded into the crosspieces.

Figure 11:
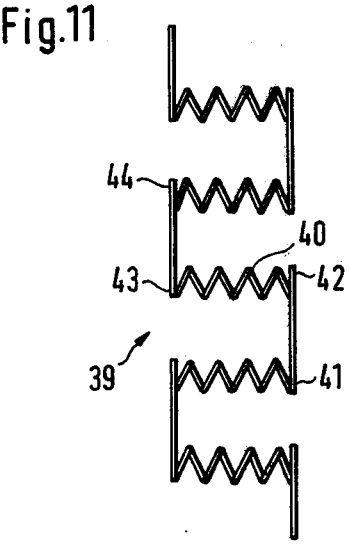

A special guide band is shown in FIG. 11. In this guide band 39 the crosspieces 40 are formed by coils which are alternately joined to each other through their corresponding ends 41, 42, or 43, 44. In this case, the whole guide band can be produced from a single piece, i.e., the guide band is coiled out of a single steel wire.

What is claimed is:

1. A freewheel clutch with a cage for receiving and retaining gripping elements, characterized in that said cage (3) consists of a flexible band (1) provided with windows (6) and having the opposite ends arranged for coupling to each other, the coupling of said cage ends (11,12) being provided by means of a locking device comprising a cage window (6') on the one band end (12) overlapping the cage window (6) of the other band end (11) and means to interlock said overlapped windows in alignment, a plurality of gripping elements (7) retained in said windows (6) of said band (1) and confined by a ladder-like guideband (19) consisting preferably of an elastic material, including a number of discontinuities (22) corresponding to the number of said cage windows (6).

2. A freewheel clutch according to claim 9, characterized in that an edge (14) of a window (6) in the cage (3) includes a spring lug (13) arranged and disposed for biasing a gripping element.

3. A freewheel clutch according to claim 2, characterized in that support flanges (9) for said gripping element (7) are provided extending from said edge of said window.

4. A freewheel clutch according to claim 3, characterized in that a window edge (8) opposite said spring lug (13) and support flanges (9) forms the countersupport for said gripping element (7).

5. A freewheel clutch according to claim 2, characterized in that said spring lug is located on the center of said window edge (14) and consists of a folded tab with a protruding tongue.

6. A freewheel clutch according to claim 1, characterized in that said gripping element (7) is tapered toward the middle.

7. A freewheel clutch according to claim 1, characterized in that said band (1), includes spring lugs (13), support flanges (9) and lateral supports (10) formed of one piece.

8. A freewheel clutch according to claim 1, characterized in that said guide band (19) is located in the interior of said cage (3).

9. A freewheel clutch according to claim 1, characterized in that individual guide band crosspieces (21) fill in the spaces between the individual gripping elements (7) without clearance and maintain the gripping elements (7) at equal distances.

10. A freewheel clutch according to claim 9, characterized in that the guide band (19) includes lateral support bands (20) and the crosspieces (21) made from a single piece.

11. A freewheel clutch according to claim 9, characterized in that the guide band (36) includes crosspieces (37) made of a synthetic material and a pair of lateral support bands (38) made in the form of wires.

12. A freewheel clutch according to claim 1, characterized in that said band (1) includes lateral supports (10) extending in a radial direction.

13. A freewheel clutch according to claim 1, characterized in that said lateral supports (10) are inclined inward toward the symmetry plane (16) of said cage (3).

14. A freewheel clutch with a cage for receiving and retaining gripping elements, characterized in that said cage (3) consists of a flexible band (1) provided with windows (6) and having the opposite ends arranged for coupling to each other, the coupling of said cage band ends (25,26) being provided by means of a locking device formed by an opening (6") having flanges and lateral supports (10') on one band end (26) and an opening (6) in the other band end (25) having lateral supports (10'), said lateral supports being divided in their middle plane defining pairs of parts (27,28 and 29,30), said pairs of parts being inclined inward for forming an interlocking connection when said band ends (25,26) are pushed together, a plurality of gripping elements (7) retained in said windows (6) and confined by a ladder-like guide-band (19) consisting preferably of an elastic material, including a number of discontinuities (22) corresponding to the number of said cage windows (6).

15. A freewheel clutch with a cage for receiving and retaining gripping elements, characterized in that said cage (3) consists of a flexible band (1) provided with windows (6) and having the opposite ends arranged for coupling to each other, a plurality of gripping elements (7) retained in said windows (6) of said band (1) and confined by a ladder-like guideband (39) located in the interior of said cage (3), the guide band (39) including crosspieces (40) consisting of continuous coils providing a number of discontinuities corresponding to the number of said cage windows (6) and which are alternately connected to each other through their corresponding ends (41,42 or 43,44).

16. A freewheel clutch according to claim 1, characterized in that said interlocking means includes lateral supports (10) on the band, a spring lug (13) and support flanges (9) within said opening (6).

* * * * *

UNITED STATES PATENT OFFICE
CERTIFICATE OF CORRECTION

PATENT NO. : 4,252,221
DATED : February 24, 1981
INVENTOR(S) : GUNTER F. LANZERATH, et al It is certified that error appears in the above-identified patent and that said Letters Patent are hereby corrected as shown below:

Column 6, line 1, cancel "claim 9" and insert -- claim 1 --.

Signed and Sealed this

Nineteenth Day of May 1981

[SEAL]

Attest:

RENE D. TEGTMEYER

Attesting Officer

Acting Commissioner of Patents and Trademarks